Patented May 10, 1949

2,469,755

UNITED STATES PATENT OFFICE 2,469,755

SYNTHESIS OF HYDROCARBONS FROM CARBON MONOXIDE AND HYDROGEN WITH AN IRON TYPE CATALYST

Alexis Voorhies, Jr., Baton Rouge, La., assignor to Standard Oil Development Company, a corporation of Delaware No Drawing. Application May 1, 1948, Serial No. 24,684

13 Claims. (Cl. 260—449.6)

This invention relates to the catalytic conversion of CO with $H_2$ and improved catalysts therefor. More specifically, the invention is concerned with improved iron catalysts for the catalytic synthesis of normally liquid hydrocarbons and/or oxygenated compounds from CO and $H_2$.

Iron type catalysts are normally employed in the hydrocarbon synthesis at relatively high temperatures of about 450–800° F. and relatively high pressures of about 3–100 atm. abs. or higher, to obtain predominantly unsaturated and oxygenated products from which motor fuels with high octane ratings may be recovered.

The extreme temperature sensitivity and relatively rapid catalyst deactivation in hydrocarbon synthesis have led in recent years to various attempts and proposals to employ the so-called fluid catalyst technique wherein the synthesis gas is contacted with a dense turbulent bed of finely divided catalyst fluidized by the gaseous reactants and products and which permits continuous catalyst replacement and greatly improved temperature control. However, the adaptation of the hydrocarbon synthesis to the fluid catalyst technique has encountered certain difficulties, particularly when iron catalysts are used.

Application of the fluid catalyst technique requires ease of fluidization and attrition resistance in addition to the conventional characteristics determining catalyst utility, such as total desired yield, and active catalyst life. The activity and utility of iron catalysts decline steadily in the course of the strongly exothermic reaction, chiefly due to the deposition of fixed carbon or coke-like material formed by reactions of CO and unstable hydrocarbons, which take place at the relatively high temperatures and pressures associated with the use of iron-base catalysts.

If allowed to accumulate excessively, these carbon or coke deposits adversely affect particularly those characteristics of the catalyst which determine its utility as a fluidizable solid in processes employing the fluid solids technique. More particularly, carbon or coke deposits have been found to be associated with rapid disintegration of the catalyst particles leading to a substantial and undesirable expansion of the fluidized bed and ultimately to the requirement of complete catalyst replacement because of fluidization difficulties. Catalyst broken down in this manner must be restored to a fluidizable particle size or is lost for further use.

Iron catalysts are usually prepared by a substantially complete reduction of various natural or synthetic iron oxides, their catalytic activity being enhanced by the addition of such promoters as various compounds of alkali metals or the oxides of chromium, zinc, magnesium, manganese, the rare earth metals, and others, in small amounts of about 0.5–10%. Hydrogen or mixtures of hydrogen and carbon monoxide, such as synthesis gas are normally used as the reducing agent at temperatures of about 600°–1600° F. All these catalysts are either subject to considerable carbonization and disintegration in fluid operation or their activity and/or selectivity to useful products are too low for satisfactory operation.

The present invention substantially reduces these difficulties and affords various additional advantages as will be fully understood from the detailed description given below.

It is therefore the principal object of the present invention to provide an improved process for the catalytic conversion of CO with $H_2$.

Another object of the invention is to provide improved iron catalysts for the catalytic conversion of CO with $H_2$ employing the fluid solids technique.

Other objects and advantages will appear hereinafter.

In accordance with the present invention iron catalysts of excellent disintegration resistance and satisfactory activity and selectivity are obtained by incorporating into iron oxides a suitable promoter such as an oxide, carbonate, halide, phosphate, etc., of sodium or potassium, subjecting the promoted oxide to fusion and rapidly cooling or shock-chilling the molten mass. The cooled mass may be sized to a desired particle size and reduced with gases rich in hydrogen in a conventional manner.

It has been found that catalysts prepared in accordance with the invention are superior to most conventional catalysts in that they combine high disintegration resistance with high yields and selectivity to desired products while most conventional iron catalysts are deficient in at least one of these essential characteristics. The beneficial effect of the method of preparing the catalyst in accordance with the invention is believed to be due to the chilling of the melt. Fusion insures good mixing of promoter and iron oxide while rapid cooling or shock-chilling arrests the crystal growth both of the iron oxide and of the incorporated promoter.

A particularly important advantage of the invention resides in the fact that it permits the preparation of highly active, highly selective iron catalyst having a high disintegration resistance from such extremely cheap and readily available raw materials as iron pyrites ashes.

Quite generally the catalysts of the invention may be prepared by fusing a promoted iron oxide and contacting the molten mass with a low boiling liquid such as water. If desired, the melt may be introduced in a subdivided state into the water, for example, by pouring the melt in a fine stream into a relatively large amount of the cooling agent, or by other conventional means. In this manner, cooling may be accelerated and particles of a desired size may be recovered directly from the cooling liquid. When obtained in large aggregates, the latter may be ground to the desired particle size and then reduced in a conventional manner. For fluid operation the catalyst should have a particle size of about 20–200 microns, preferably about 30–100 microns.

The invention and its beneficial results will be further illustrated by the following specific examples.

EXAMPLE 1

An iron pyrites ash having the following composition

|  | Per cent |
|---|---|
| $Fe_2O_3$ | 96.4 |
| $SiO_2$ | 1.5 |
| $Al_2O_3$ | 0.4 |
| MnO | 0.1 |
| CaO, MgO, ZnO | 1.9 |
| NiO, CuO, $Cr_2O_3$ | 0.2 | was impregnated with an aqueous solution of $K_2CO_3$ until the ash contained 2% $K_2CO_3$. The impregnated ash was dried and heated in an electric resistance furnace until a substantial central portion of the furnace charge was fused. The fused portion of the charge was then immersed in water. The chilled material was crushed and sized and reduced at 900° F. for six hours with 5000 volumes of hydrogen per volume of iron oxide per hour.

The catalyst so obtained was tested in fixed bed operation at the conditions and with the results summarized in Table I below.

Table I

| Temperature, °F | 600 | |
|---|---|---|
| Pressure, p. s. i. g | 250 | |
| Feed, $H_2$/CO | 2.11/1 | |
| V./v./hr | 198 | |
| Material balance, weight per cent | 97 | 99 |
| CO conv., per cent input | 93 | 89 |
| CO conv., per cent output | 93 | 88 |
| CC. oil/m.³ $H_2$+CO Fed | 84 | 85 |
| Catalyst disintegration rate | 79 | |
| Distr. ratio, $C_4$+/$C_1$+ | 0.63 | 0.69 |
| Yield, cc. $C_4$+/m.³ $H_2$+CO cons., calculated from $C_4$+/$C_1$+ distr. ratio | 189 | 206 |

The catalyst disintegration rate is defined as grams of 0–20 micron particles formed per 100 grams of 20+ micron particles per 100 hours as determined in an accelerated disintegration test carried out at fluid conditions including a temperature of 700° F., atmospheric pressure, an $H_2$:CO ratio of 2:1, a superficial linear velocity of 0.7 ft./sec. and a treating time of 7 hours. Disintegration rates of conventional iron catalysts vary within the wide range of from 0 to about 1500.

The above data demonstrate that a highly active and selective catalyst of very low disintegration rate may be prepared from cheap iron pyrites ashes in accordance with the invention.

EXAMPLE 2

A catalyst was prepared substantially as described in Example 1, with the exception that the fused portion of the furnace charge was permitted to cool more slowly by air cooling on a flat surface. The sized and reduced catalyst was tested in fixed bed operation as specified in Table II below.

Table II

| Temperature, °F | 600 |
|---|---|
| Pressure, p. s. i. g | 250 |
| Feed, $H_2$/CO | 2.05/1 |
| V./v./hr | 204 |
| Material balance, weight per cent | 88 |
| CO conv., per cent input | 95 |
| CO conv., per cent output | 95 |
| CC. oil/m.³ $H_2$+CO Fed | 79 |
| Disintegration rate | 30–40 |
| Distr. ratio, $C_4$+/$C_1$+ | 0.54 |
| Yield, cc. $C_4$+/m.³ $H_2$+CO cons., calculated from $C_4$+/$C_1$+ distr. ratio | 161 |

It will be observed that in this test conventional pyrites catalyst, while exhibiting a catalyst disintegration rate of substantially the same order of magnitude, was clearly inferior to the catalyst of the invention described in Example 1, with respect to valuable liquid products. These results indicate that the process of the invention affords a substantial improvement in the performance of pyrites catalyst without any loss in disintegration resistance.

Most other conventional iron catalysts are either much more expensive to prepare without any compensation with respect to activity or disintegration resistance, which is true for instance for ammonia synthesis catalyst (fused high purity magnetite promoted with alumina and potassium); or they are more expensive and, in addition, less active when of equal disintegration resistance as in the case of sintered precipitated iron oxides or the like.

While the tests reported in the foregoing examples were carried out in fixed bed operation these data are indicative of the fact that improvements of the same type may be secured in fluid operation when employing the catalysts of the present invention.

Suitable conditions for fluid operation include temperatures of about 600°–750° F., pressures of about 200–600, preferably about 400–500 lbs. sq. in., throughputs of about 500 to 10,000 volumes of fresh synthesis gas per volume of catalyst per hour, $H_2$:CO ratios in the fresh synthesis gas of about 0.5–1.5:1, gas recycle ratios of about 0–5:1, and superficial linear gas velocities of about 0.3–3 ft. per second at catalyst particle sizes of about 30–200 microns to establish apparent bed densities of about 40–150 lbs. per cu. ft.

The present invention is not to be limited by any theory of the mechanism of the process or catalyst nor to any examples given merely for illustration purposes, but only by the following claims which are intended to claim all novelty inherent in the invention.

What is claimed is:

1. An improved iron catalyst for the synthesis of hydrocarbons and oxygenated organic compounds from CO and $H_2$, which essentially consists of a reduced iron oxide shock-chilled from the molten state and containing a promotional amount of an alkali metal promoter.

2. The catalyst of claim 1 in which said oxide is an iron pyrites ash.

3. The catalyst of claim 1 in which said catalyst has a fluidizable particle size of about 20–200 microns.

4. The method of preparing iron-type catalysts for the synthesis of hydrocarbons and oxygenated organic compounds from CO and $H_2$, which comprises incorporating a promotional amount of a suitable iron catalyst promoter into an iron oxide, fusing the promoted iron oxide, shock-chilling the molten mass, and reducing the cooled material with a gas rich in hydrogen.

5. The material of claim 4 in which said promoter is an alkali metal compound.

6. The method of claim 4 in which said iron oxide is an iron pyrites ash.

7. The method of claim 4 in which said molten mass is shock-chilled by contact with a low-boiling liquid.

8. The method of claim 7 in which said liquid is water.

9. The method of claim 7 in which said molten mass is contacted in a subdivided state with said liquid.

10. The method of claim 4 in which said cooled mass is ground to a fluidizable particle size.

11. An improved process of synthesizing valuable conversion products from CO and $H_2$ in the presence of iron catalysts which comprises contacting a gas containing CO and $H_2$ in synthesis proportions at synthesis conditions with an iron type catalyst prepared by incorporating into an iron oxide a promotional amount of an alkali metal promoter, fusing the promoted oxide, shock-chilling the molten mass and reducing the cooled material with a gas rich in hydrogen.

12. The process of claim 11 in which said iron type catalyst is present in the form of a dense tubulent mass of fluidized catalyst particles.

13. The process of claim 11 in which said iron oxide is iron pyrites ash.

ALEXIS VOORHIES, Jr.

REFERENCES CITED

The following references are of record in the file of this patent:

UNITED STATES PATENTS

| Number | Name | Date |
|---|---|---|
| 1,695,041 | Elmen | Dec. 11, 1928 |
| 2,038,251 | Vogt | Apr. 21, 1936 |
| 2,183,145 | Michael et al. | Dec. 12, 1939 |
| 2,369,548 | Elian | Feb. 13, 1945 |

OTHER REFERENCES

U. S. Naval Technical Mission in Europe (page 74), P. B. 22841.